May 25, 1943.   N. C. PRICE   2,320,008
SOLENOID OPERATED VALVE
Filed April 18, 1941
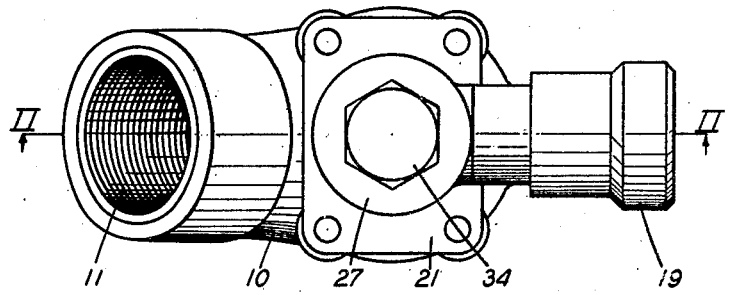
FIG-I
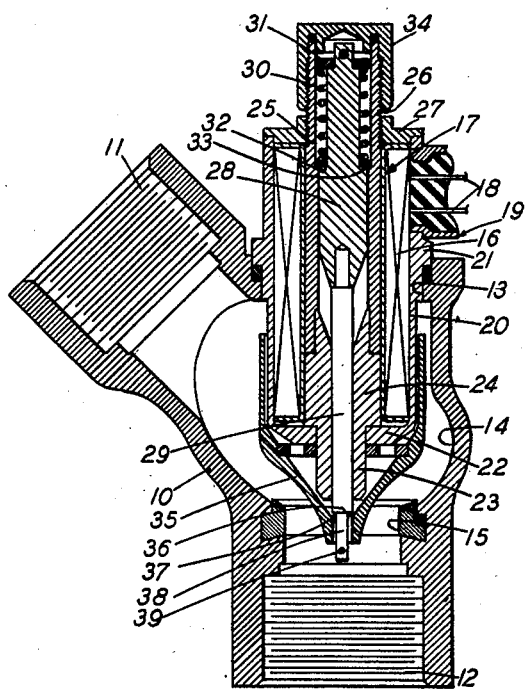
FIG-II
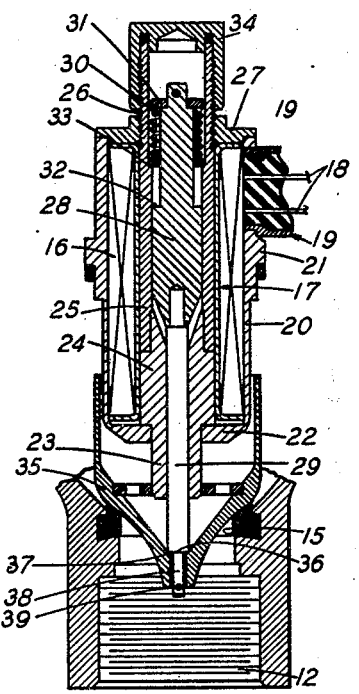
FIG-III
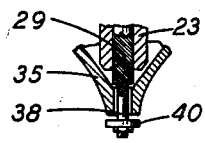
FIG-IV
INVENTOR Patented May 25, 1943

2,320,008

UNITED STATES PATENT OFFICE 2,320,008

SOLENOID OPERATED VALVE

Nathan C. Price, Hollywood, Calif., assignor to Lockheed Aircraft Corporation, Burbank, Calif.

Application April 18, 1941, Serial No. 389,218

2 Claims. (Cl. 137—139)

This invention relates to remote electric control of fluid valves, wherein fluid pressure on the valve serves to positively open and close the same, the electric control actuating a small pilot valve for unbalancing the hydraulic pressures acting on the main valve, and thereby actuate the same.

It is an object of this invention to provide a positively opening and closing hydraulically operated liquid control valve of the least possible weight and restriction to the flow of liquid when open, the valve being energized by a solenoid operated pilot valve not subjected to unbalanced hydraulic forces and, therefore, not requiring a large solenoid, or a heavy current draw for operation.

It is another object of this invention to provide an improved remotely controlled valve of the type described wherein a solenoid operated pilot valve upsets the hydraulic balance of the valve to cause fluid pressure to close or open the main valve.

It is a further object of this invention to provide a fluid valve of the type described wherein a solenoid operates a pilot valve energizing the main valve, the solenoid being so mounted in a shell as to form a stationary piston telescoping into the movable part of the valve to induce a hydraulic unbalance therein for self operation of the valve by the fluid pressure acting thereon, the flow of fluid between the valve and piston serving to cool the solenoid.

It is also an object of this invention to provide a hydraulically operated valve wherein unbalanced hydraulic forces are created by the operation of a solenoid controlled pilot valve, the hydraulically operated valve being capable of being either opened or closed by energization of the solenoid according to the arrangement of operation of the latter.

Other and further important objects of this invention will be apparent from the disclosures in the specification and the accompanying drawing.

This invention is shown in the accompanying drawing in a form suitable for use in the fuel lines of an airplane, and the embodiment chosen for the primary illustration is intended to provide an emergency shut-off of the fuel supply from a given tank, upon energization of the solenoid.

As shown in the drawing;

Figure I is a plan view of a fuel valve embodying the features of this invention, as applied to an emergency shut-off valve.

Figure II is a central vertical section on the line II—II of Figure I, showing the valve in its normal open position.

Figure III is a fragmentary section similar to Figure II showing the valve closed due to energization of the solenoid.

Figure IV is a fragmentary showing of the pilot valve modified to operate this valve, a normally closed one, to be opened by energization of the solenoid.

The embodiment of this invention chosen for illustration purposes in Figures I to III, is intended to be applied as an emergency shut-off valve in the fuel lines to each of a number of engines, the individual valves being remotely controlled by electric circuits for energizing the solenoids when it is desired to shut off one or more fuel lines.

The valve of this invention can be arranged to either open or close a liquid line upon energization of the solenoid, merely by suitably arranging the direction of motion of the solenoid armature relative to the pilot valve seat in the main valve. For illustrative purposes, the first form of the invention has been chosen to show the valve arranged to be closed by the solenoid, the valve being self-opening upon opening the electrical circuit.

A suitable body 10 is provided with an inlet 11 and outlet 12 for connection to suitable conduits. The body is provided with a top opening 13 in line with the outlet 12 to form a valve and solenoid chamber 14, the vertical position of the operating axis being preferable to minimize friction, but not being essential to the invention. A valve seat 15, preferably of a resilient rubber-like material, is positioned in a groove in the body 10 between the valve chamber and the outlet.

A solenoid 16, comprising a plurality of turns of insulated wire wound on a non-magnetic spool 17, has its electric terminals 18 brought out to a connecting plug, the enclosing shank 19 of which is secured to a shell 20 embracing the solenoid and having a flange 21 engaging the opening 13 of the valve body, the flange being secured to the valve body 10 by screws to seal the solenoid in place in the opening.

The lower end of the shell 20 is closed in at 22 to embrace a neck 23 on a stationary armature 24 of highly magnetic properties, the shell 20 and armature 24 being secured together in any suitable manner, as by threading or silver soldering. The stationary armature 24 in turn supports a non-magnetic sleeve 25 forming a hollow core inside the solenoid spool, the upper end of the sleeve extending above the solenoid spool and being threaded at 26 to receive a collar 27 closing the open end of the shell 20.

A movable armature 28 is slideable in the sleeve 25 and carries a depending valve stem 29 which passes through a central aperture in the stationary armature 24, the valve stem and armature 28 being drawn downwardly against the stationary armature 24 upon excitation of the solenoid. This movement of the armature is resisted by a light coil spring 30, one end of which rests under a collar 31 on the armature 28 and the other end on matching shoulders 32 and 33 in the sleeve 25 and on the armature 28, the arrangement being such that alignment of the shoulders determines the upper limit of armature travel. The upper end of the sleeve 25 is sealed by means of a cap 34 threaded thereon, removal of the cap permitting removal of the armature 28 and the valve stem 29 carried thereby.

That part of the sleeve 20 which projects into the valve body forms a stationary piston relative to a cup-like poppet 35 which slides thereon with sufficient clearance to allow limited passage of the liquid being handled, thus transmitting the liquid pressure to the interior of the poppet. The clearance necessary may vary with the type of fluid being handled, in the case of gasoline I have found that five-thousandths of an inch on the diameter will satisfactorily energize the poppet valve when the hydraulic pressures inside and outside are unbalanced, as will now be described.

The lower end of the poppet valve 35 is formed with a central passage defining an interior seat 37 against which a shoulder 36 on the valve stem is adapted to seat, this shoulder forming a pilot valve. A reduced extension 38 of the stem 29 projects through the passage and carries a pin 39 in its extremity, to limit relative movement between the poppet 35 and stem 29. The length of the unreduced portion of the valve stem is so adjusted that the shoulder 36 is held off the seat 37, with the valve open in the position shown in Figure II, thus equalizing fluid pressures inside and outside the poppet valve 35.

The available outlet opening at the point of the poppet valve 35, which is controlled by the pilot valve 36, is so proportioned relative to the clearance between the piston 20 and poppet valve 35 that substantial release of liquid pressure within the poppet valve is obtained by opening the pilot valve.

Upon energization of the solenoid 16, the movable armature 28 is drawn downward to seat the pilot valve 36. The solenoid need only be strong enough to overcome the spring 30 as it is not required to move the poppet valve 35. Closing the pilot valve in this manner builds up a fluid pressure within the poppet valve, which is of greater diameter than the valve seat 15, so that the inlet pressure acting on the inside of the poppet valve is capable of closing the main valve. As long as the solenoid is excited, the pilot valve 36 will remain closed and the movable armature will follow the downward or seating movement of the poppet valve, the speed of closing of the latter being accelerated by liquid flow from the inlet to the outlet and being limited by the clearance between the shell 20 and the valve 35, since fluid must enter this space to permit movement of the valve 35.

In order to reopen the valve, de-energization of the solenoid 16 allows the movable armature 28 to be returned by the spring 30 to the position of Figure II. It does not snap back, however, because of the pin 39, but yieldingly holds the pilot valve 36 off its seat 37 as the poppet valve 35 is lifted by the unbalanced fluid pressure acting on the external surfaces thereof above the valve seat. It will be noted from Figure II that the clear area of the outlet is smaller than the diameter of the poppet valve, and this annular area will be acted on by the inlet fluid pressure while the pressure within the valve 35 will be substantially released by the opening of the pilot valve 36, even though liquid continues to flow into the interior of the valve 35, due to its clearance on the stationary shell 20. This continued flow of liquid, while the pilot valve is unseated, serves to rapidly cool the solenoid after release thereof, and while the main valve is closed a considerable area of the solenoid is directly exposed to the liquid, thus preventing overheating of the solenoid.

The fragmentary showing of Figure IV substitutes a valve disc 40 for the pin 39, this disc seating against the end or nose of the poppet valve 35 and therefore reversing the action of the pilot valve, the solenoid spring serving to normally hold the valve disc 40 against its seat, which results in the poppet valve 35 being normally held against its seat 15 by the fluid pressure acting therein, the armature 28 being mechanically drawn down nearly to the position shown in Figure III. A slight further downward movement of the armature in response to excitation of the solenoid will open the pilot valve 40 allowing the poppet valve 35 to lift off its seat, carrying the pilot valve and armature upwardly into the position shown in Figure II. Upon release of the solenoid circuit the pilot valve closes and the main or poppet valve will be forced to its seat by fluid pressure.

It will thus be seen that I have invented an improved and simplified solenoid operated valve that can be arranged to either open or close a fluid line by means of unbalanced fluid pressures created by the operation of a pilot valve by a solenoid, the solenoid being partially immersed in the fluid and serving as a guide for the fluid actuated valve.

Having thus described my invention and the present preferred embodiments thereof, I desire to emphasize the fact that many modifications may be resorted to in a manner limited only by a just interpretation of the following claims.

I claim:

1. In an electrically controlled fluid valve, a body having suitable inlet and outlet passages, a valve chamber and a valve seat in said chamber adjacent said outlet passage, a shell forming a stationary piston projecting into said valve chamber in spaced alignment with said valve seat, a cup-like valve member adapted in one position to engage said seat and guided upon said stationary piston, said valve member having sufficient clearance thereon to permit leakage of fluid into the interior thereof and having a central outlet passage for the release of fluid so leaking thereinto, a solenoid positioned in said shell, a non-magnetic sleeve within said solenoid, said sleeve having an internal shoulder intermediate the end thereof, a stationary magnetic armature secured to one end of said sleeve, a movable armature slideable within said sleeve upon energization of said solenoid, said movable armature having an intermediate shoulder aligned with the shoulder in said sleeve when the armature is in its unenergized position, a coil spring having one end fixed relative to the armature and the other end cooperating with both said shoulders whereby to permit preloading of said spring, and a pilot valve carried by said movable armature and cooperating with the central outlet passage in said valve member to control the same, whereby the balance between fluid pressures inside and outside the valve member is adapted to be varied by energization of the solenoid with a resulting fluid actuation of the valve member.

2. In a solenoid controlled valve, a body having inlet and outlet passages and a valve seat intermediate thereof, a valve controlling the passage through said valve seat, a solenoid chamber, an annular solenoid within said solenoid chamber, cooperating fixed and movable armatures centrally disposed in said solenoid, a sleeve associated with the fixed armature within which sleeve the movable armature slides, means connecting the movable armature to the valve, said sleeve having an internal shoulder in cooperative relationship with an external shoulder on the movable armature, and a coil spring having one end fixed relative to the movable armature and the other end cooperating with both said shoulders when the solenoid is not energized, whereby to permit preloading of said spring on said movable armature.

NATHAN C. PRICE.